(12) United States Patent
Woodford

(10) Patent No.: US 12,482,196 B2
(45) Date of Patent: *Nov. 25, 2025

(54) LIGHT INVARIANT PATTERN MAPPING

(71) Applicant: Snap Inc., Santa Monica, CA (US)

(72) Inventor: Oliver Woodford, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,824

(22) Filed: Apr. 6, 2023

(65) Prior Publication Data

US 2023/0245399 A1 Aug. 3, 2023

Related U.S. Application Data

(63) Continuation of application No. 17/456,487, filed on Nov. 24, 2021, now Pat. No. 11,682,176, which is a
(Continued)

(51) Int. Cl.
*G06T 19/00* (2011.01)
*G06T 7/73* (2017.01)

(52) U.S. Cl.
CPC ............. *G06T 19/006* (2013.01); *G06T 7/73* (2017.01); *G06T 2200/04* (2013.01); *G06T 2200/08* (2013.01); *G06T 2207/20084* (2013.01)

(58) Field of Classification Search
CPC ..... G06T 19/006; G06T 7/73; G06T 2200/04; G06T 2200/08; G06T 2207/20084;
(Continued)

(56) References Cited

U.S. PATENT DOCUMENTS 5,986,668 A 11/1999 Szeliski et al.
5,987,164 A 11/1999 Szeliski et al.
(Continued)

FOREIGN PATENT DOCUMENTS

| CN | 102750537 A | 10/2012 |
|---|---|---|
| CN | 109242873 B | 10/2022 |
| JP | 2016021097 A * | 2/2016 |

OTHER PUBLICATIONS

Xu, B., Chang, P., Welker, C. L., Bazarova, N. N., & Cosley, D. (Feb. 2016). Automatic archiving versus default deletion: what Snapchat tells us about ephemerality in design. In Proceedings of the 19th ACM conference on computer-supported cooperative work & social computing (pp. 1662-1675).*
(Continued)

*Primary Examiner* — Sarah Lhymn
(74) *Attorney, Agent, or Firm* — Schwegman Lundberg & Woessner, P.A.

(57) ABSTRACT

A correlation system can be implemented on a user device (e.g., smartphone) to perform image processing tasks e.g., point to point correlations for tasks such as alignment, tracking, and reconstruction of model data. The correlation system can implement normalized cross correlation in a least squares optimization scheme without use of approximations. Normalized cross correlation optimized via least squares can further implement global and local cost functions that are invariant to dynamic lighting conditions.

20 Claims, 13 Drawing Sheets

Related U.S. Application Data continuation of application No. 16/457,607, filed on Jun. 28, 2019, now Pat. No. 11,217,022.

(58) Field of Classification Search
CPC ........ G06T 7/33; G06V 10/25; G06V 10/255; G06V 10/764; G06V 10/945; G06V 20/20
See application file for complete search history.

(56) References Cited

U.S. PATENT DOCUMENTS

| | | | |
|---|---|---|---|
| 6,018,349 | A | 1/2000 | Szeliski et al. |
| 7,817,855 | B2* | 10/2010 | Yuille ................ G06V 20/63 382/176 |
| 8,913,821 | B1 | 12/2014 | Agarwal et al. |
| 2002/0094135 | A1* | 7/2002 | Caspi ................. G06T 7/20 348/E5.054 |
| 2005/0105804 | A1 | 5/2005 | Francos et al. |
| 2011/0244919 | A1* | 10/2011 | Aller ................ G06V 40/168 382/165 |
| 2012/0287247 | A1* | 11/2012 | Stenger ............. H04N 13/128 348/47 |
| 2013/0101230 | A1* | 4/2013 | Holeva ............... B66F 9/24 382/224 |
| 2014/0072217 | A1 | 3/2014 | Xu et al. |
| 2014/0369557 | A1* | 12/2014 | Kayombya ............ G06T 7/73 382/103 |
| 2014/0378810 | A1* | 12/2014 | Davis ............... G06F 16/248 600/407 |
| 2015/0199572 | A1* | 7/2015 | Kim .................. G06T 7/251 382/103 |
| 2015/0356767 | A1 | 12/2015 | Suma et al. |
| 2016/0073117 | A1* | 3/2016 | Grasmug ............ H04N 19/23 375/240.26 |
| 2016/0328998 | A1* | 11/2016 | Pedersen ............. A61B 8/4245 |
| 2016/0335522 | A9 | 11/2016 | Melikian |
| 2017/0221272 | A1* | 8/2017 | Li .................. G06T 19/006 |
| 2017/0301099 | A1* | 10/2017 | Otomaru .............. G06T 7/344 |
| 2018/0033190 | A1* | 2/2018 | Ma ................... G06T 13/40 |
| 2018/0068178 | A1* | 3/2018 | Theobalt ............. G06T 13/40 |
| 2018/0164400 | A1 | 6/2018 | Wirola et al. |
| 2018/0314906 | A1 | 11/2018 | Yang et al. |
| 2019/0035431 | A1* | 1/2019 | Attorre .............. G10L 25/30 |
| 2019/0097866 | A1* | 3/2019 | Sestok, IV .......... H04L 27/3863 |
| 2019/0122378 | A1* | 4/2019 | Aswin ................ G06N 3/045 |
| 2019/0172223 | A1 | 6/2019 | Vajda et al. |
| 2019/0222830 | A1* | 7/2019 | Edwin ............... G02B 27/0172 |
| 2019/0387168 | A1* | 12/2019 | Smith ................ G06T 7/248 |
| 2021/0165852 | A1 | 6/2021 | Granger et al. |
| 2022/0084293 | A1 | 3/2022 | Woodford |

OTHER PUBLICATIONS

Tjahjadi, Martinus Edwin. "Photogrammetric area-based least square image matching for surface reconstruction." Elektrika 1, No. 01 (2017).*

Raschka, Sebastian. "About Feature Scaling and Normalization." Jul. 11, 2014, available at: https://sebastianraschka.com/Articles/2014_about_feature_scaling.html, pp. 1-18.*

"U.S. Appl. No. 16/457,607, 312 Amendment filed Nov. 22, 2021".

"U.S. Appl. No. 16/457,607, Examiner Interview Summary mailed May 18, 2020", 3 pgs.

"U.S. Appl. No. 16/457,607, Final Office Action mailed Nov. 13, 2020", 13 pgs.

"U.S. Appl. No. 16/457,607, Non Final Office Action mailed Feb. 25, 2021", 18 pgs.

"U.S. Appl. No. 16/457,607, Non Final Office Action mailed Jul. 17, 2020", 36 pgs.

"U.S. Appl. No. 16/457,607, Notice of Allowance mailed Aug. 23, 2021", 9 pgs.

"U.S. Appl. No. 16/457,607, Response filed Feb. 16, 2021 to Final Office Action mailed Nov. 13, 2020", 8 pgs.

"U.S. Appl. No. 16/457,607, Response filed Jun. 9, 2020 to Restriction Requirement mailed Mar. 9, 2020", 8 pgs.

"U.S. Appl. No. 16/457,607, Response filed Jul. 26, 2021 to Non Final Office Action mailed Feb. 25, 2021", 14 pages.

"U.S. Appl. No. 16/457,607, Response filed Oct. 19, 2020 to Non Final Office Action mailed Jul. 17, 2020", 11 pgs.

"U.S. Appl. No. 16/457,607, Restriction Requirement mailed Mar. 9, 2020".

"U.S. Appl. No. 17/456,487, Non Final Office Action mailed Oct. 25, 2022", 10 pgs.

"U.S. Appl. No. 17/456,487, Notice of Allowance mailed Feb. 13, 2023", 10 pgs.

"U.S. Appl. No. 17/456,487, Response filed Jan. 25, 2023 to Non Final Office Action mailed Oct. 25, 2022", 7 pgs.

Bae, Kyeong-Ryeol, et al., "A hardware architecture based on the NCC algorithm for fast disparity estimation in 3D shape measurement systems", Journal of the Korean Sensor Society, 19(2), (2010), 99-111.

Chang, Che-Han, et al., "CLKN: Cascaded Lucas-Kanade Networks for Image Alignment", Proceedings of the IEEE Conference on Computer Vision and Pattern Recognition, (2017), 2213-2221.

Furukawa, Y., et al., "Accurate, Dense, and Robust Multiview Stereopsis", IEEE Transactions on Pattern Analysis and Machine Intelligence, 32(8), (Aug., 2010), 1362-1376.

Heo, Yong Seok, et al., "Illumination and Camera Invariant Stereo Matching", IEEE Conference on Computer Vision and Pattern Recognition, (Jun. 2008), 8 pgs.

Hisham, M B, et al., "Template matching using sum of squared difference and normalized cross correlation", IEEE student conference on research and development (SCOReD), (2015), 100-104.

Tzimiropoulos, Georgios, et al., "Gauss-Newton Deformable Part Models for Face Alignment in-the-Wild", Proceedings of the IEEE Conference on Computer Vision and Pattern Recognition, (2014), 8 pgs.

Woodford, Oliver J, "Using Normalized Cross Correlation in Least Squares Optimizations", arXiv preprint, arXiv:1810.04320v1 [cs.CV], (2018), 9 pgs.

* cited by examiner

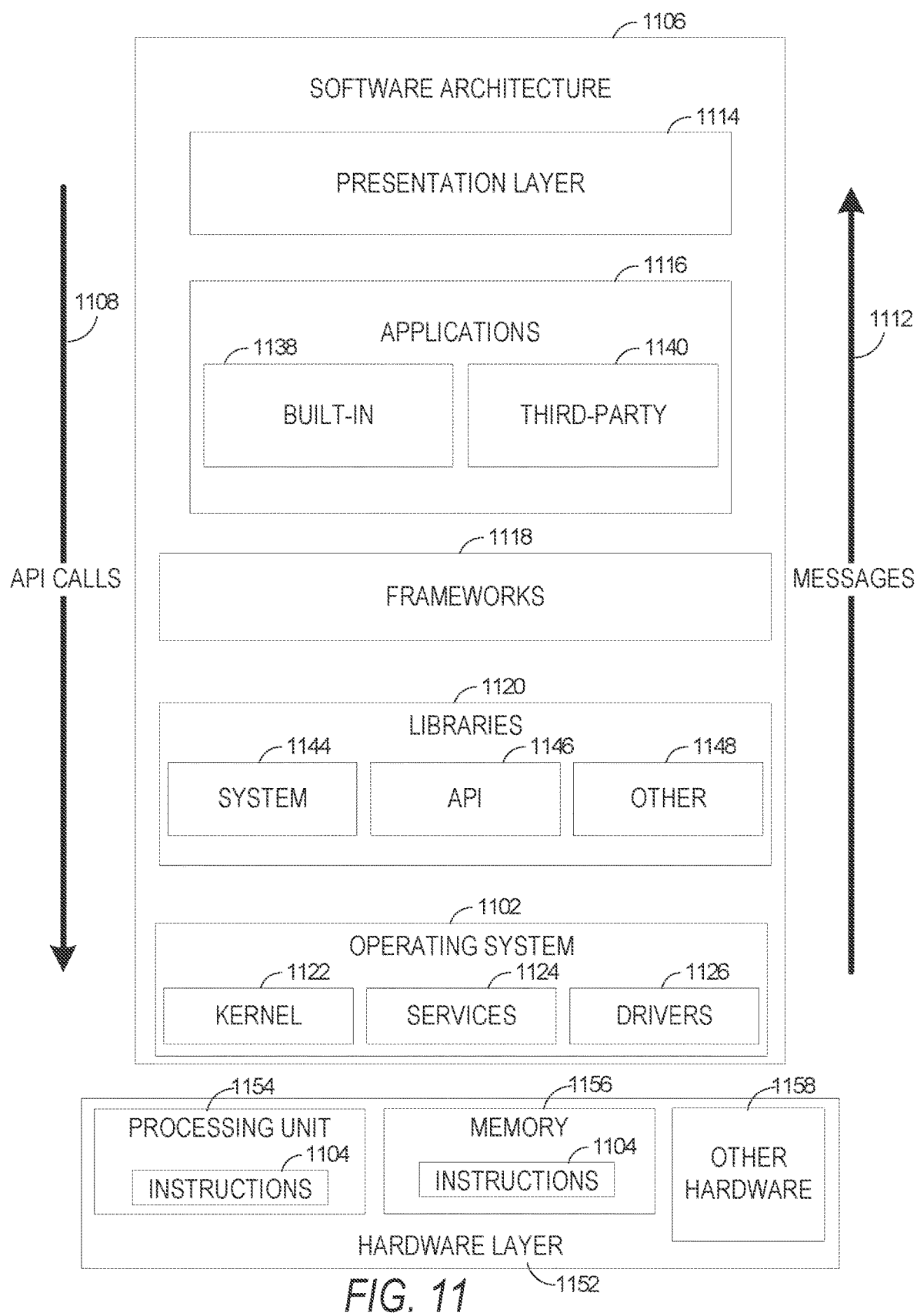

LIGHT INVARIANT PATTERN MAPPING

CLAIM OF PRIORITY

This application is a continuation of U.S. patent application Ser. No. 17/456,487, filed on Nov. 24, 2021, which is a continuation of U.S. patent application Ser. No. 16/457,607, filed on Jun. 28, 2019, which are incorporated herein by reference in their entireties.

TECHNICAL FIELD

The present disclosure generally relates to special-purpose machines that manage image processing and improvements to such variants, and to the technologies by which such special-purpose machines become improved compared to other special-purpose machines for data pattern processing.

BACKGROUND

Image registration is a computational task in which points of one image are aligned or matched to points in another image. For example, if a source image depicts the Empire State Building in New York City from one angle and a target image depicts the Empire State Building from another angle, image registration techniques can be applied to pixels from the source image to pixels of the target image that depict the same feature (e.g., match source image pixels depicting the spire of the Empire State Building to target image pixels that depict the spire, albeit from a slightly different perspective). Image registration is useful for a variety of tasks, such as alignment, medical imaging, object tracking, and three-dimensional (3D) model reconstruction from two-dimensional (2D) images. It is currently difficult from some computational devices with limited resources (e.g., smartphones) to implement image registration in an accurate manner due to the computational complexity of the tasks used in image registration, such as cross correlation. It is further difficult and often impractical for a resource-limited computational device to apply these computational techniques to each frame of a video in real time or near real time.

BRIEF DESCRIPTION OF THE DRAWINGS

To easily identify the discussion of any particular element or act, the most significant digit or digits in a reference number refer to the figure ("FIG.") number in which that element or act is first introduced.

FIG. 11 is a block diagram illustrating a representative software architecture, which may be used in conjunction with various hardware architectures herein described.

DETAILED DESCRIPTION

Figure 1:
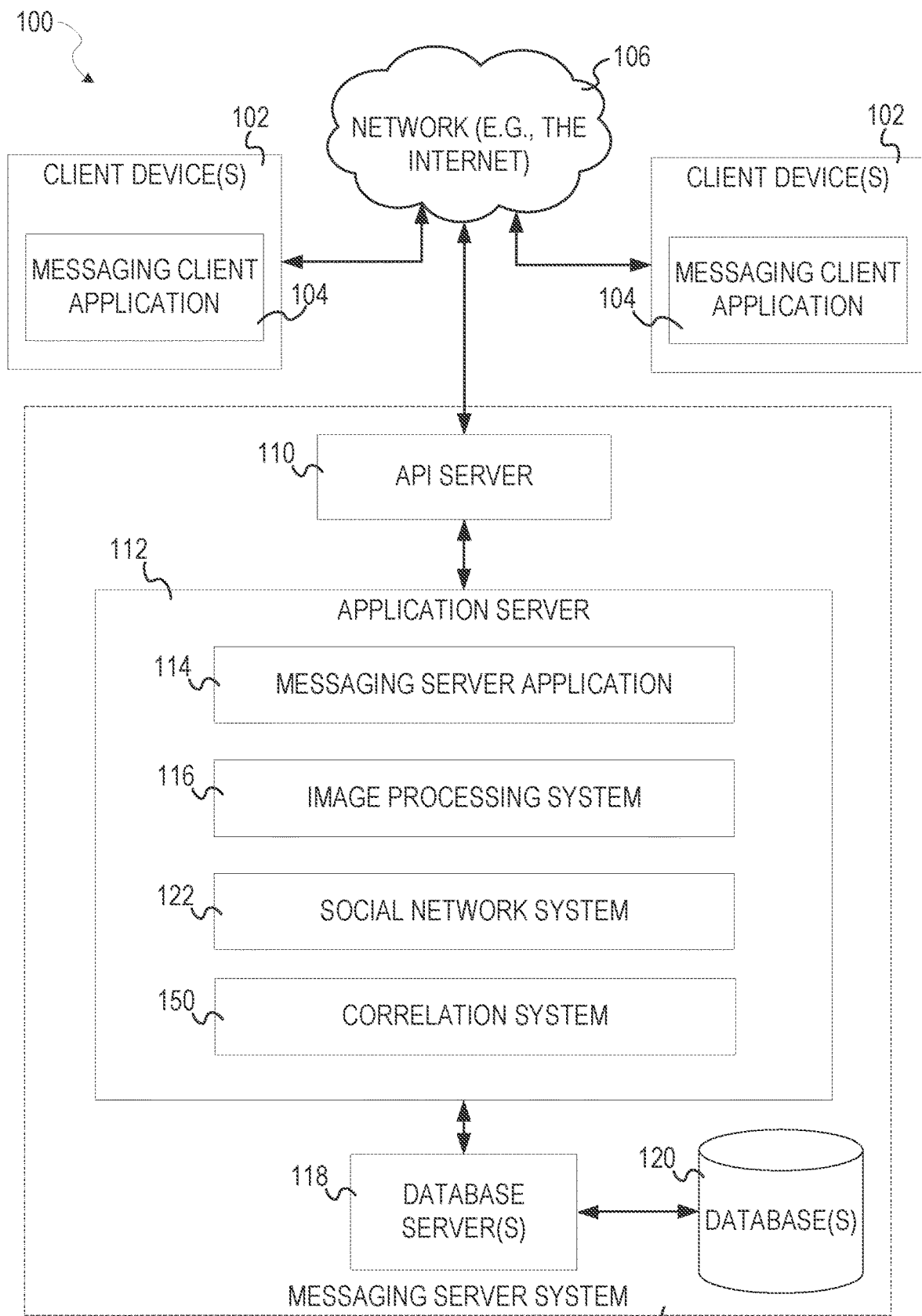
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it is difficult to implement image registration on resource-limited devices, such as user devices or smartphones with limited memory and processor power. One difficulty arises from the complexity of the schemes used in image registration techniques, such as cross correlation processing and least squares optimization schemes. Generally, least squares optimization is an optimization tool that can be applied in computational vision tasks, such as visual odometry and active appearance models. Cross correlation is another computational task that statistically measures the similarity between two signals. The normalized version of cross correlation (normalized cross correlation (NCC)) normalizes the means and variances of the data before applying cross correlation, thereby making the measure robust to global changes in gain and bias. Applications of NCC include multi-view stereo image processing, industrial surface deformation measurement, and two-dimensional keypoint tracking, which are instances of local image registration.

Some past approaches for direct vision have implemented photometric least squares minimizations for efficiency, and other past approaches have implemented normalized cross correlation techniques for its robustness to light intensity changes. However, these two approaches have not been combined without matrix approximations (e.g., using an identity matrix instead of a Jacobian matrix) which causes computational slowness and further yields low-quality results. To this end, the correlation system discussed in detail below is configured to implement least squares optimization of normalized cross correlation without approximation in a computationally efficient and robust approach that can readily be executed on user devices, such as a client device. The correlation system is superior to past approaches, both in terms of convergence rate and computation time on an image alignment problem. One benefit of the correlation system is its robust and sparse least squares normalized cross correlation (herein referred to as LSNCC) that mitigates local intensity variations and improves robustness to partial occlusions (e.g., variations in a depicted image object due to various lighting conditions such as shadows, bright lights, the sun, etc.). Additionally, the correlation system is configured with a Jacobian of the data normalization function used in the LSNCC scheme, which allows the NCC to be optimized in a least squares framework without resorting to approximate derivatives. Additionally, the correlation system implements an iterative update step of an inverse compositional Gauss-Newton optimization of the NCC that involves only a single pass over sampled data points, which improves the efficiency of the optimization.

FIG. 1 shows a block diagram of an example messaging system 100 for exchanging data (e.g., messages and associated content) over a network 106. The example messaging system 100 is an example network environment in which correlation system can be implemented, according to some example embodiments. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a correlation system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114.

The correlation system 150 is a server-side instance comprising one or more functional engines discussed with reference to FIG. 6 below. For example, the correlation system 150 on the server side can comprise a correlation engine 620 and a construction engine 625 to generate 3D models from 2D images using 3D model reconstruction techniques, according to some example embodiments.

Figure 2:
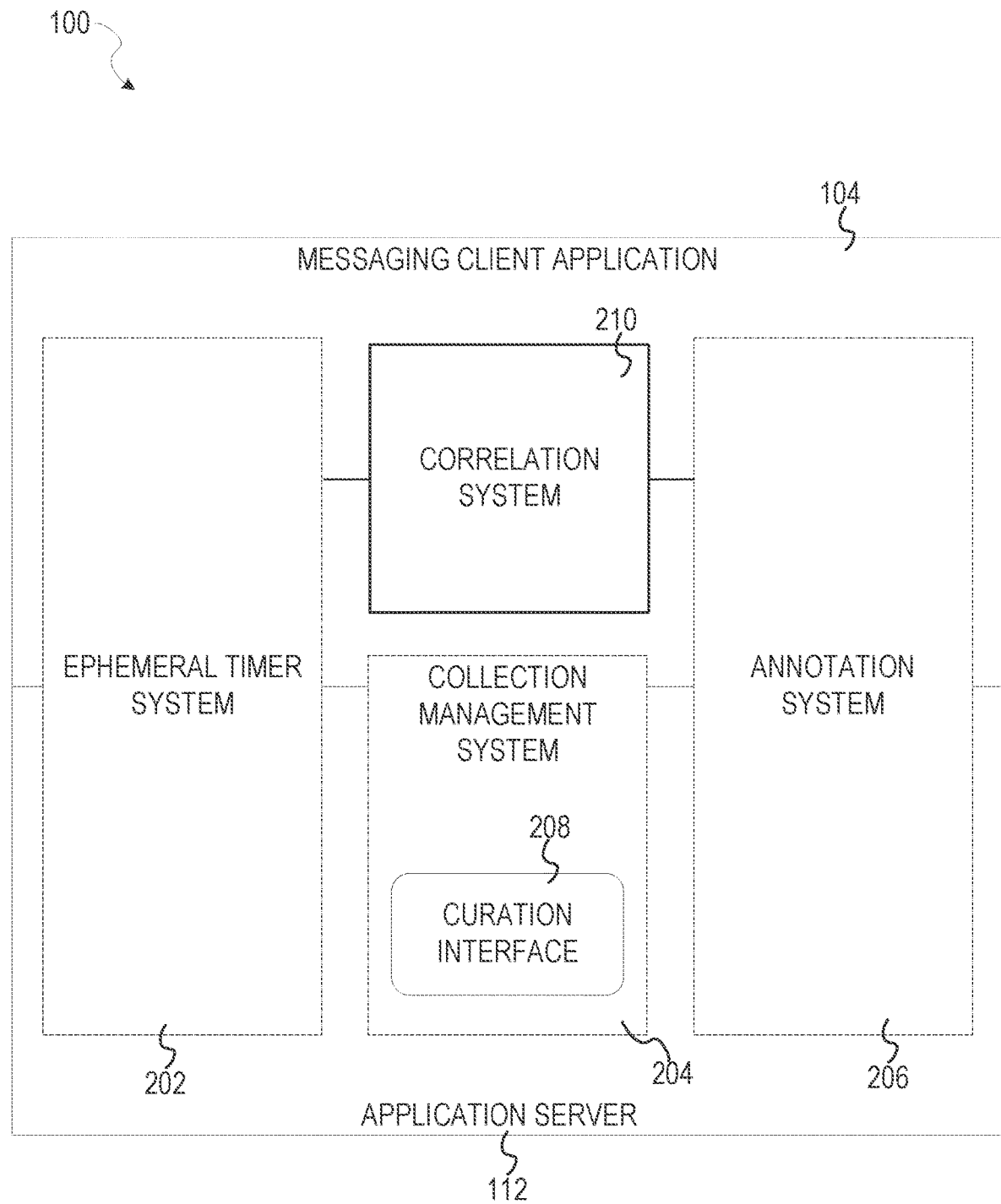
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a correlation system 210 which operates on the client side (e.g., executed by client device 102).

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

As discussed in further detail below, the correlation system 210 is configured to display icon and icon content based on the display settings and location data of a client device 102.

Figure 3:
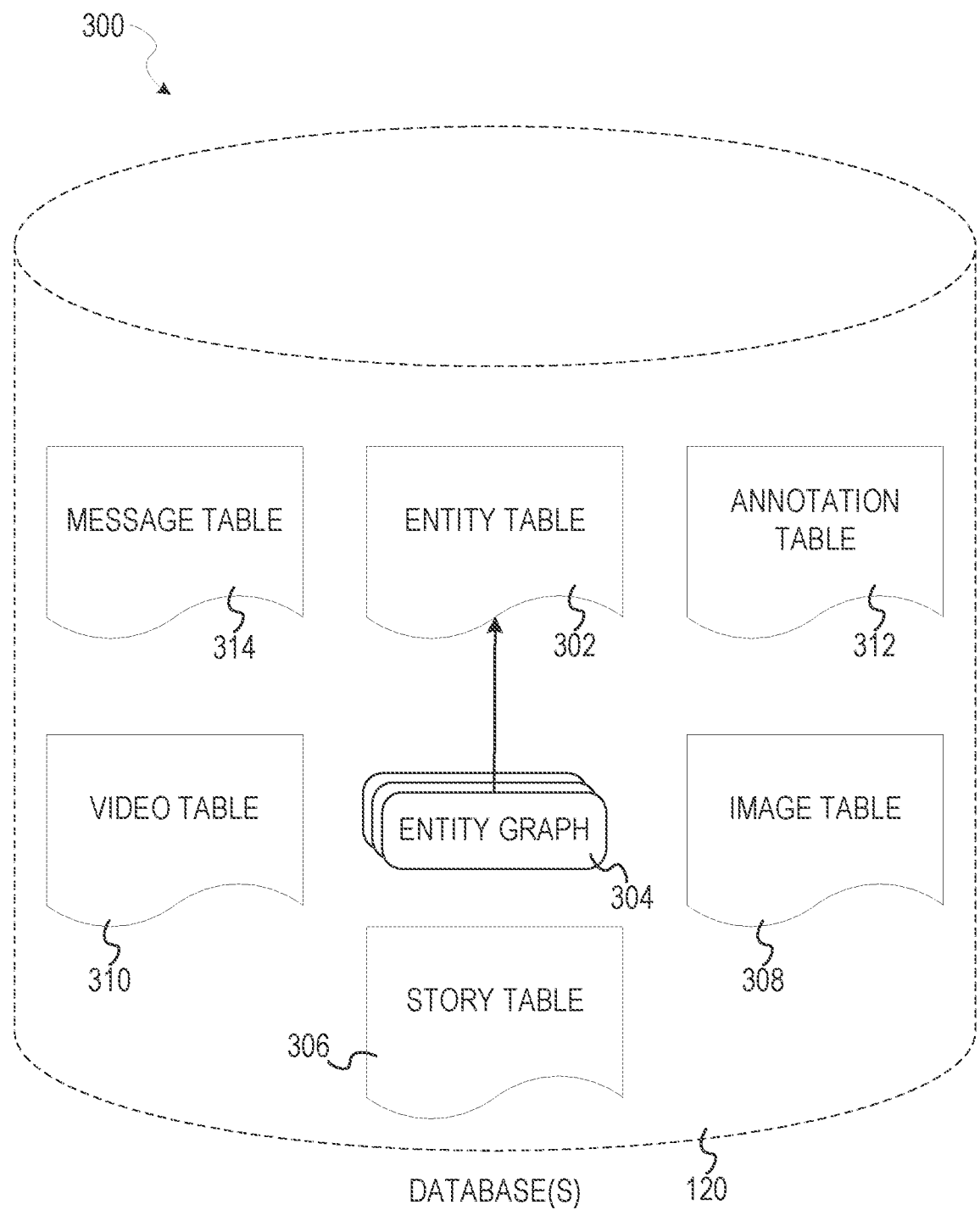
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data 300 may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
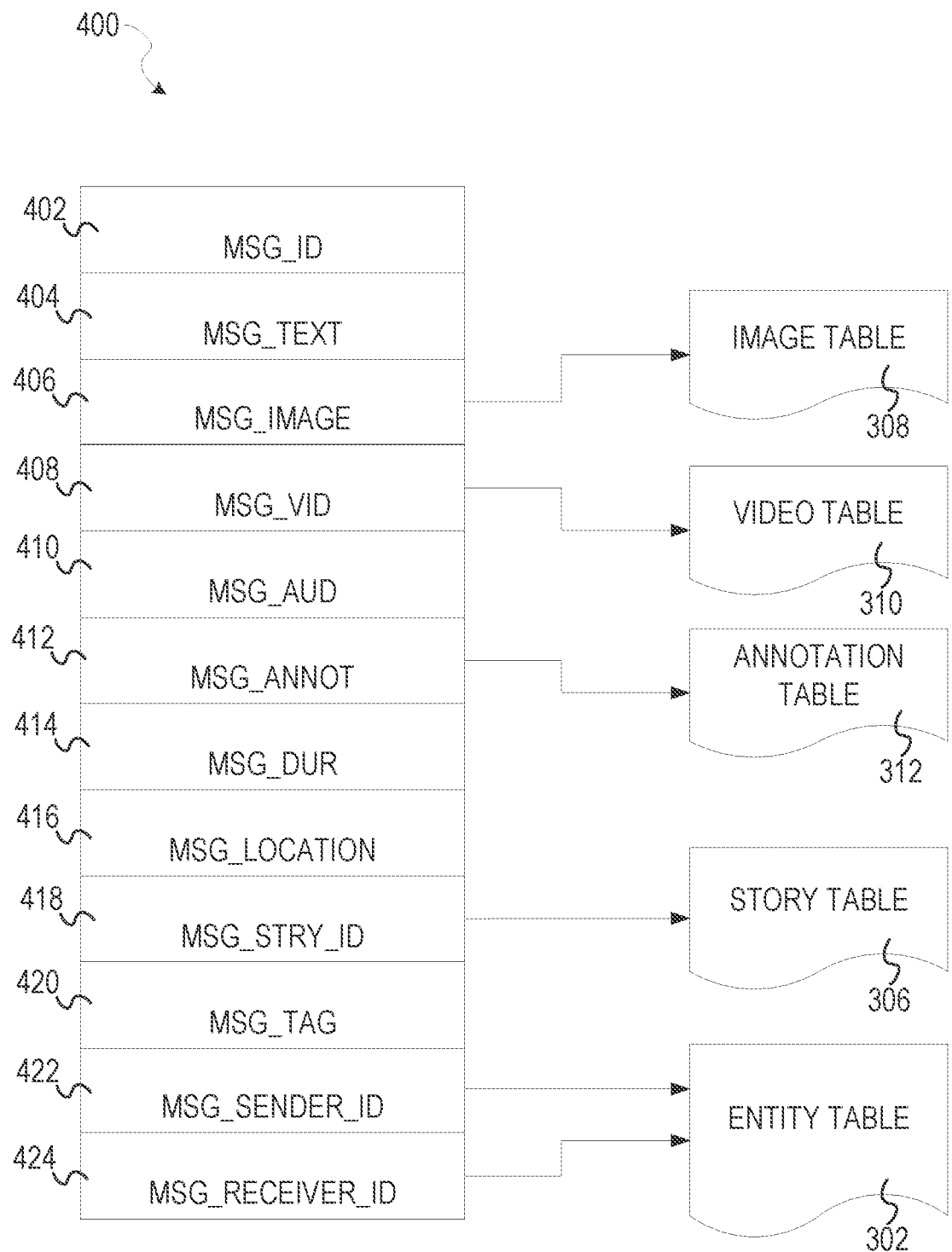
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
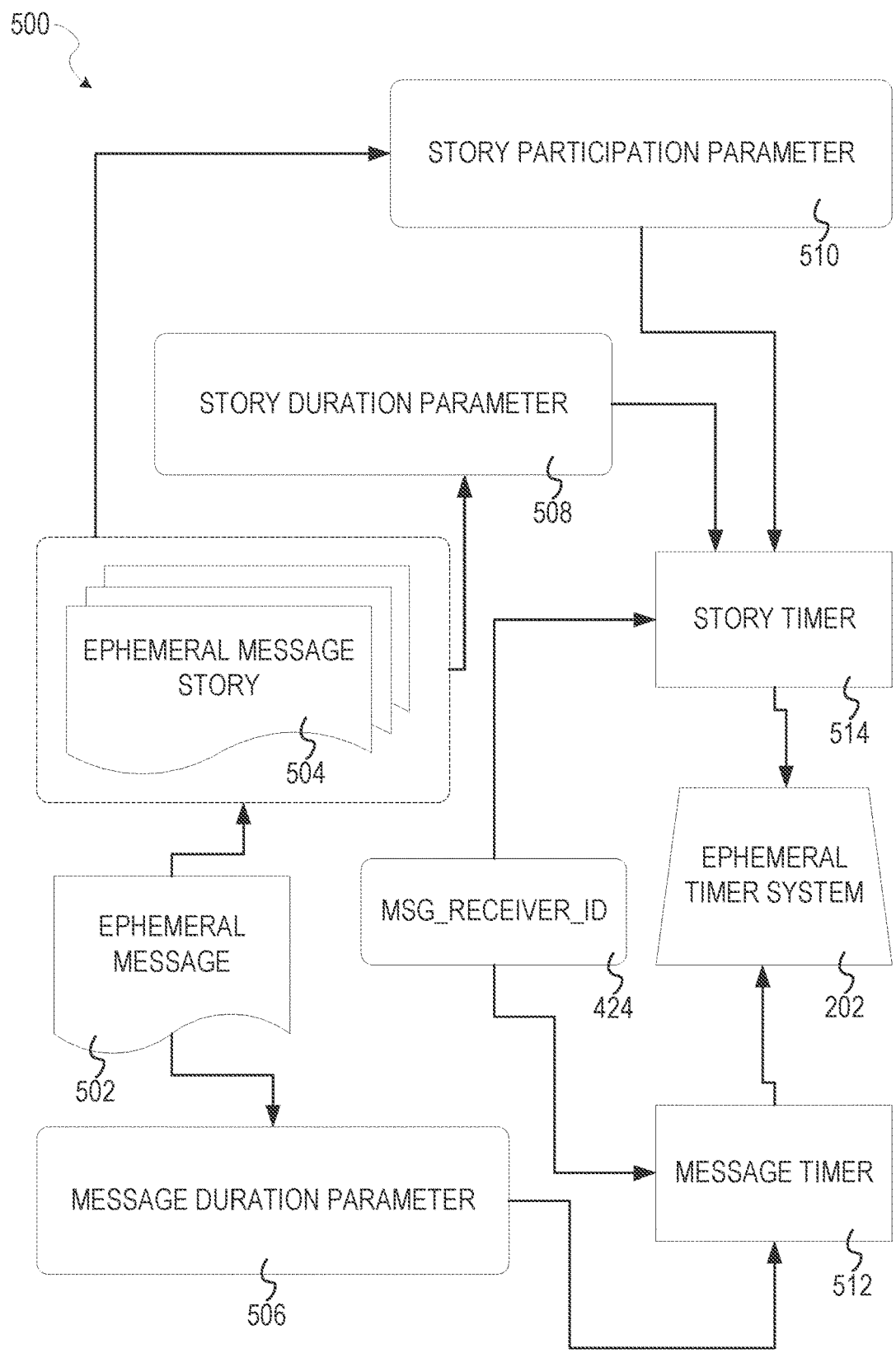
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
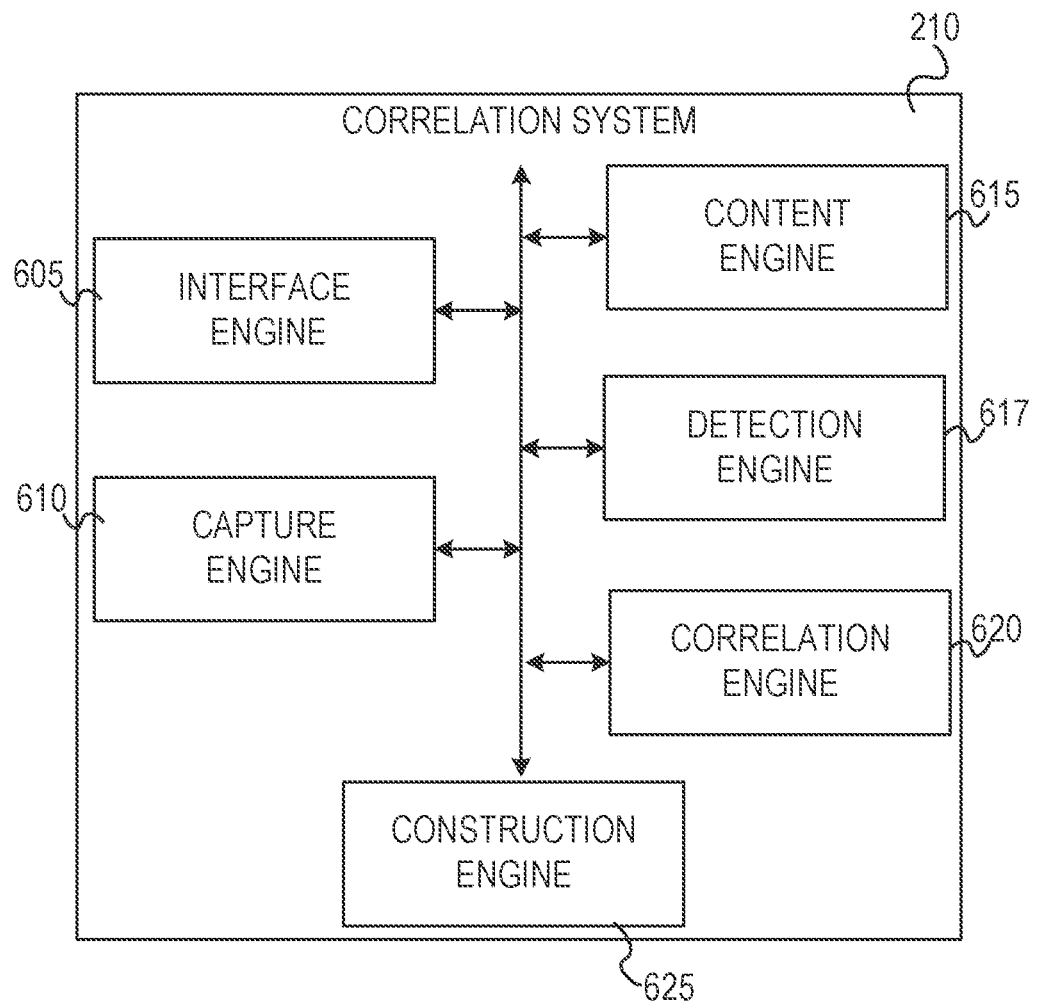
FIG. 6 shows an example correlation system, according to some example embodiments.

FIG. 6 shows an example correlation system 210, according to some example embodiments. As illustrated, the system 210 includes an interface engine 605, a capture engine 610, a content engine 615, a detection engine 617, a correlation engine 620, and a construction engine 625. The interface engine 605 is configured to receive input data from a user of the client device 102 and generate user interface content for display on the client device. The capture engine 610 is configured to generate image data using an image sensor of the client device 102. The content engine 615 is configured to use the tracked data points from the correlation engine 620 to perform further actions on the client device 102, such as displaying content when a given pattern or set of points is detected or tracked.

The detection engine 617 is configured to detect a pattern or image feature to be aligned via the correlation engine 620. For example, the detection engine 617 can comprise a convolutional neural network trained to detect a coffee cup shape in an image and store region of interest data (ROI data) that the correlation uses as initial estimate data for alignment purposes across different images using a normalized cross correlation scheme with least squares optimization, as discussed in further detail below.

The construction engine 625 is configured to perform 3D construction techniques from images using the normalized cross correlation with least squares optimization. The constructed 3D model data can be used for further processing, such as tracking and alignment via the correlation engine 620.

The correlation engine 620 mapping of a pattern in one or more images (e.g., in each frame of a video) using an improved cross correlation approach that integrates global data of an image and local data in highly dynamic lighting environments. The term "pattern" is used here as an example; however, it is appreciated that the correlation engine 620 can perform point to point comparison of sets of points that can resemble a pattern (e.g., a company logo) in different types of data. For example, in the following examples, the correlation engine 620 tracks an image in a two-dimensional image; however, the correlation engine 620 can likewise be implemented to correlate points in differently dimensioned data, e.g., 1D audio data, 3D volumetric modeling data and so on. Further, as used here, the term mapping is image registration or mapping of points in one image of a given scene or object to corresponding points in another image of the same scene or object. The image registration techniques can implement normalized cross correlation with least squares optimization to perform mapping tasks, such as alignment of points, model reconstruction, and tracking. A detailed discussion of the normalized cross correlation with least squares scheme is discussed here followed by examples with reference to FIGS. 7-11B.

To start, assume the normalization function, $\Psi$, is defined: $\mathbb{R}^M \to \mathbb{R}^M$, which takes a vector of length M, and normalizes the vector such that it has zero mean and unit variance. Thus:

$$\Psi(\bar{T}) = \frac{\bar{T} - \mu_{\bar{T}}}{\sigma_{\bar{T}}}, \mu_{\bar{T}} = \frac{1^\top \bar{T}}{M}, \sigma_{\bar{T}} = \|\bar{T} - \mu_{\bar{T}}\|, \quad (1)$$

where 1 is a vector of ones. The standard formulation of NCC is a measure of similarity between a source and target vector, $\bar{S}$ and $\bar{T}$ respectively, which should be maximized. The NCC can be written as:

$$E_{NCC}(\bar{S}, \bar{T}) = \Psi(\bar{T})^T \Psi(\bar{S}). \quad (2)$$

The above measure is bounded, in the range $[-1, 1]$. This is equivalent (negated, up to scale and ignoring a scalar offset) to the sum of squared differences between the two normalized vectors, thus:

$$\begin{aligned} E_{ZNSSD}(\bar{S}, \bar{T}) &= \|\Psi(\bar{T}) - \Psi(\bar{S})\|^2, & (3) \\ &= \|\Psi(\bar{T})\|^2 + \|\Psi(\bar{S})\|^2 - 2\Psi(\bar{T})^T \Psi(\bar{S}), & (4) \\ &= 2 - 2E_{NCC}(\bar{S}, \bar{T}), & (5) \end{aligned}$$

since $\|\Psi(\bullet)\|^2 = 1$ by definition. This latter measure, which is minimized, not only has its optimum at the same inputs, but the gradients of the two measures are proportional (with a scale factor of $-2$) for all inputs. It is bounded in the range: [0,4]. Further, since it is formulated as a sum of squared errors, it is optimized within a least squares framework. This confers the benefit that linear to quadratic convergence of the measure can be achieved using only first derivatives of the error, $\Psi(\bar{T}) - \Psi(\bar{S})$. Herein, $E_{ZNSSD}$ is referred to as the NCC least squares cost.

Generally, NCC can be optimized with respect to a registration between source (e.g., logo template) and target data (e.g., potential logo pattern depicted in a user-generated image). The source and target samples, S and T, are scalar or vector fields of n dimensions, according to some example embodiments. The registration is found such that the aligned samples are most similar, under the measure. These fields could be one dimensional (e.g., audio data), two dimensional (e.g., image data), three dimensional (e.g., volumetric data), or higher, according to some example embodiments. In the below explanation, the formulation is only applied to single channel image data to simplify notation. However, it is appreciated that the formulation can likewise be applied to other dimensionalities of data, and that least squares generalizes to multiple channels, as enabled by the correlation engine 620.

In the imaging example, the source and target data are then: S, T $\in \mathbb{R}^{H \times W}$. The coordinates of values within the source data field to be registered are given by a matrix of M having homogeneous coordinates, denoted $X \in \mathbb{R}^{S \times M}$, where $S \geq 3$. According to some example embodiments, X consists of the dense grid of all pixel coordinates in S, but this is by no means required; in other example embodiments, the coordinates are arbitrary. These coordinates can be of greater than three dimensions if, for example, they represent the three-dimensional location of the surface visible in the image (where S=4), or a where a quadratic registration is used (where S=6). The transformation of coordinates X to the target coordinate frame is given by $$Y = \pi(WX), \quad (6)$$

where $W \in \mathbb{R}^{3 \times S}$ is the warp matrix, which applies a linear transformation to the coordinates, and $\pi: \mathbb{R}^{3 \times M} \to \mathbb{R}^{2 \times M}$ applies any non-linearities present in the measurement process to each column of WX. In the case of images, this is a projection onto the image plane, and a correction for camera calibration and lens distortion. This evaluation task uses an elementary projection: $\pi([x, y, z]^T) = [x/z, y/z]^T$. Other data modalities, and indeed some image warps (e.g., an affine warp), do not require a projection, in which case $\pi$ is the identity function. In some example embodiments, the warp matrix W may over-constrain the registration, but is kept on the manifold of allowed registrations using a warp update parameterization, as discussed in further detail below. The target data is sampled at the coordinates Y, using interpolation, producing a sampled data vector, denoted by a bar, e.g., $\bar{I}$. This sampling is expressed using the following notation:

$$\bar{I} = I(Y). \quad (7)$$

The entire warp process described by the warp function $\Pi$: $\mathbb{R}^{H \times W}, \mathbb{R}^{S \times M}, \mathbb{R}^{3 \times S} \to \mathbb{R}^M$, is denoted:

$$\bar{I} = \Pi(I, X, W), \quad (8)$$

$$= I(\pi(WX)). \quad (9)$$

The NCC least squares error for the registration between source and target is then given by:

$$\varepsilon_{S,T,X}(W) = \Psi(\Pi(T,X,W)) - \Psi(\Pi(S,X,I)), \quad (10)$$

where I is the identity matrix.

Using the above notation, the standard NCC least squares cost function for registration can be expressed as $$E_{global} = \|\varepsilon_{S,T,X}(W^*)\|^2. \quad (11)$$

The above is the global cost, as it is invariant to global gain and bias. In addition to global cost, the correlation engine 620 is further configured with a robust, and locally normalized cost:

$$E_{local} = \sum_{i=1}^K \rho(\|\varepsilon_{S,T,X_i}(W)\|^2). \quad (12)$$

The local cost function consists of a sum of local NCC costs, making this cost invariant to local variations in intensity. Though the NCC cost is bounded, it is nevertheless rare that large costs (especially those >2, which indicate inversely correlated patches) provide a gradient towards the global optimum, in contrast to costs close to zero. Yet in a sum of such costs, larger costs will have a greater impact on the solution. For this reason, each cost in the equation is made more robust by a function ρ: $\mathbb{R}+ \to \mathbb{R}+$, that downweights large errors, such that costs that are close to converging have more influence than costs that are far from converged, according to some example embodiments.

Processing homogeneous regions: when a homogenous patch is passed through $\Psi$ it will result in the vector 0/0, which is undefined. Using the global cost, this would be a rare occurrence, since patches used for registration are generally large. However, using the local cost, patches used can be of arbitrary length (e.g., down to three samples) and cover small regions of an image; therefore it is quite possible that some of these patches will enter homogeneous regions in the course of an optimization. To address this, the correlation engine 620 determines whether $\sigma_{\bar{I}}=0$, and if so the system sets $\sigma_{\bar{I}}=1$ instead, such that the output patch is 0. As a result, the cost (e.g., un-robustified cost) of a target patch in a homogeneous region, assuming the source patch is not homogeneous, will always be 1. For this reason, in order to avoid homogeneous regions that create local minima, the correlation engine 620 is configured to use a robustification function which truncates the least squares cost at or below 1, according to some example embodiments.

Implementing NCC Jacobians in the correlation engine 620: Conventional approaches have not generated the Jacobian of the NCC least squares cost function, $\Psi$, which can cause slowness in generating output data. It is noted that all parts of equation (1) are differentiable and thusly the analytic Jacobian $$\frac{\partial}{\partial \Delta} \Psi(\bar{I})$$

can be computed first by subtracting the mean, then by applying length normalization using the quotient rule, as follows:

$$\frac{\partial}{\partial T}(T - \mu_T) = I - \frac{11^\top}{M}, \tag{13}$$

$$\frac{\partial}{\partial \hat{I}} \frac{\hat{I}}{\sigma_{\hat{I}}} = \frac{I\sigma_{\hat{I}} - \hat{I}^\top \hat{I}/\sigma_{\hat{I}}}{\sigma_{\hat{I}}^2}, \tag{14}$$

where $\hat{I} = I - \mu_T$. Applying the chain rule and rearranging (using $\Psi(\bar{I}) = \hat{I}/\sigma_{\hat{I}}$) yields:

$$J_\Psi = \frac{I - \Psi(\bar{I})\Psi(\bar{I})^\top}{\sigma_{\hat{I}}}\left(I - \frac{11^\top}{M}\right). \tag{15}$$

One feature of $J_\Psi$ is that it is infinite when $\sigma_{\bar{I}}=0$. As with the function $\Psi$ itself, likewise set $\phi_{\bar{I}}=1$, in this case, with the result that the Jacobian will be zeros, since the homogenous region must have zero image gradients. This means the homogeneous region will have no impact on the update step.

From implementing the Sherman-Morrison matrix inverse identity, a second feature of $J_\Psi$ is that $$\left(I - \frac{11^\top}{M}\right)^{-1} = I + \frac{11^\top}{M(1 - 1^\top 1/M)}, \tag{16}$$

$$= I + \frac{11^\top}{0}, \tag{17}$$

$$\left(I - \Psi(\bar{I})\Psi(\bar{I})^\top\right)^{-1} = I + \frac{\Psi(\bar{I})\Psi(\bar{I})^\top}{1 - \Psi(\bar{I})^\top \Psi(\bar{I})}, \tag{18}$$

$$= I + \frac{\Psi(\bar{I})\Psi(\bar{I})^\top}{0}. \tag{19}$$

and therefore $J_\Psi$ is not invertible. Both the subtraction of the mean and the unit length normalization reduce the rank of $J_\Psi$ by 1, such that its rank is $\leq M-2$. However, since the linear system of equation 23 (below) has N unknowns, a rank of only N is sufficient to constrain the solution of the least squares problem. In some example embodiments when $K(M-2) \geq N$, a unique solution can be generated by correlation engine 620.

Warp update parameterization: To support inverse and ESM approaches (see Jacobian Computation, below), the correlation engine 620 updates the warp via a compositional approach. Given a vector of the change in variables, $\Delta \in \mathbb{R}^N$, which is computed at each iteration of the optimization (see below), the warp is updated as follows:

$$W \leftarrow W\Phi(\Delta), \tag{20}$$

where $\Phi: \mathbb{R}^N \to \mathbb{R}^{S \times S}$ converts an update vector into a warp matrix, such that the set of warps is a group. In some example embodiments, the warp update parameterizations are:

$$\Phi_T(\Delta) = \begin{bmatrix} 1 & 0 & \Delta_1 \\ 0 & 1 & \Delta_2 \\ 0 & 0 & 1 \end{bmatrix}, \tag{21}$$

$$\Phi_H(\Delta) = \begin{bmatrix} 1+\Delta_4+\Delta_5 & \Delta_6-\Delta_3 & \Delta_1 \\ \Delta_6+\Delta_3 & 1+\Delta_4-\Delta_5 & \Delta_2 \\ \Delta_7 & \Delta_8 & 1-2\Delta_4 \end{bmatrix}, \tag{22}$$

where $\Phi_T$ encodes 2-d translations, and $\Phi_H$ encodes homographies, based on generators of the SL(3) Lie group.

Iterative Updater: The correlation engine 620 can implement different non-linear least squares optimizers (e.g., Gauss-Newton, Levenberg-Marquardt, etc.) to optimize the costs given in equations (11) and (12) for each image. The per iteration update for equation (12) (of which equation (11) is a special case) is defined as follows:

$$\Delta = (J^\top J)^{-1}(J^\top \mathcal{E}), \tag{23}$$

$$\mathcal{E} = \begin{bmatrix} \rho'_1 \mathcal{E}_{S,T,X_1}(W) \\ \vdots \\ \rho'_K \mathcal{E}_{S,T,X_K}(W) \end{bmatrix}, J = \begin{bmatrix} \rho'_1 J_1 \\ \vdots \\ \rho'_K J_K \end{bmatrix} \tag{24}$$

$$J_i = \frac{\partial}{\partial \Delta} \mathcal{E}_{S,T,X_i}(W\Phi(\Delta))|_{\Delta=0}, \tag{25}$$

$$= \left[\frac{\partial}{\partial \Delta_1} \mathcal{E}_{S,T,X_i}(\cdot) \cdots \frac{\partial}{\partial \Delta_N} \mathcal{E}_{S,T,X_i}(\cdot)\right], \tag{26}$$

$$\rho'_i = \frac{\partial}{\partial s}\rho(s)|_s = \|\mathcal{E}_{S,T,X_i}(W)\|^2. \tag{27}$$

The scalar values $\rho_i'$ are weights which account for robustification, in an iteratively reweighted least squares version. In some example embodiments, the correlation engine 620 repeats this update until $\Delta < 10^{-10}$, or the least squares cost fails to go below the minimum found for three consecutive iterations.

Jacobian computation: The correlation engine 620 can implement different Jacobians for compositional warp updates including: (1) a forwards compositional implementation, (2) an inverse compositional implementation, and (3) an Efficient Second-order Minimization (ESM) implementation.

In the forwards compositional implementation, the standard Jacobians are given by differentiation of equation (10):

$$\vec{J} = \frac{\partial}{\partial \Delta} \Psi(\Pi(T, X, W\Phi(\Delta))).$$

In the inverse compositional implementation, the Jacobians are computed in the source image, at the identity warp $$\overleftarrow{J} = \frac{\partial}{\partial \Delta} \Psi(\Pi(S, X, \Phi(\Delta))),$$

such that they are constant. When Gauss-Newton is used, the pseudo inverse: $J^+=(J^T J)^{-1} J^T$, can also be precomputed, resulting in a much faster update. However, robust kernels weight the Jacobian, therein changing the value of the pseudo-inverse at each iteration, so it cannot be precomputed when robustification is used.

In the ESM implementation, taking the average of the above two Jacobians, $$\overleftrightarrow{J} = \frac{1}{2}\left(\overleftarrow{J} + \vec{J}\right),$$

provides a more accurate estimate of the Hessian, improving both the rate and speed (number of iterations) of convergence. In some example embodiments, the correlation engine 620 generates the analytic derivatives at runtime to align matching points in data, e.g., for pattern registration.

Figure 7:
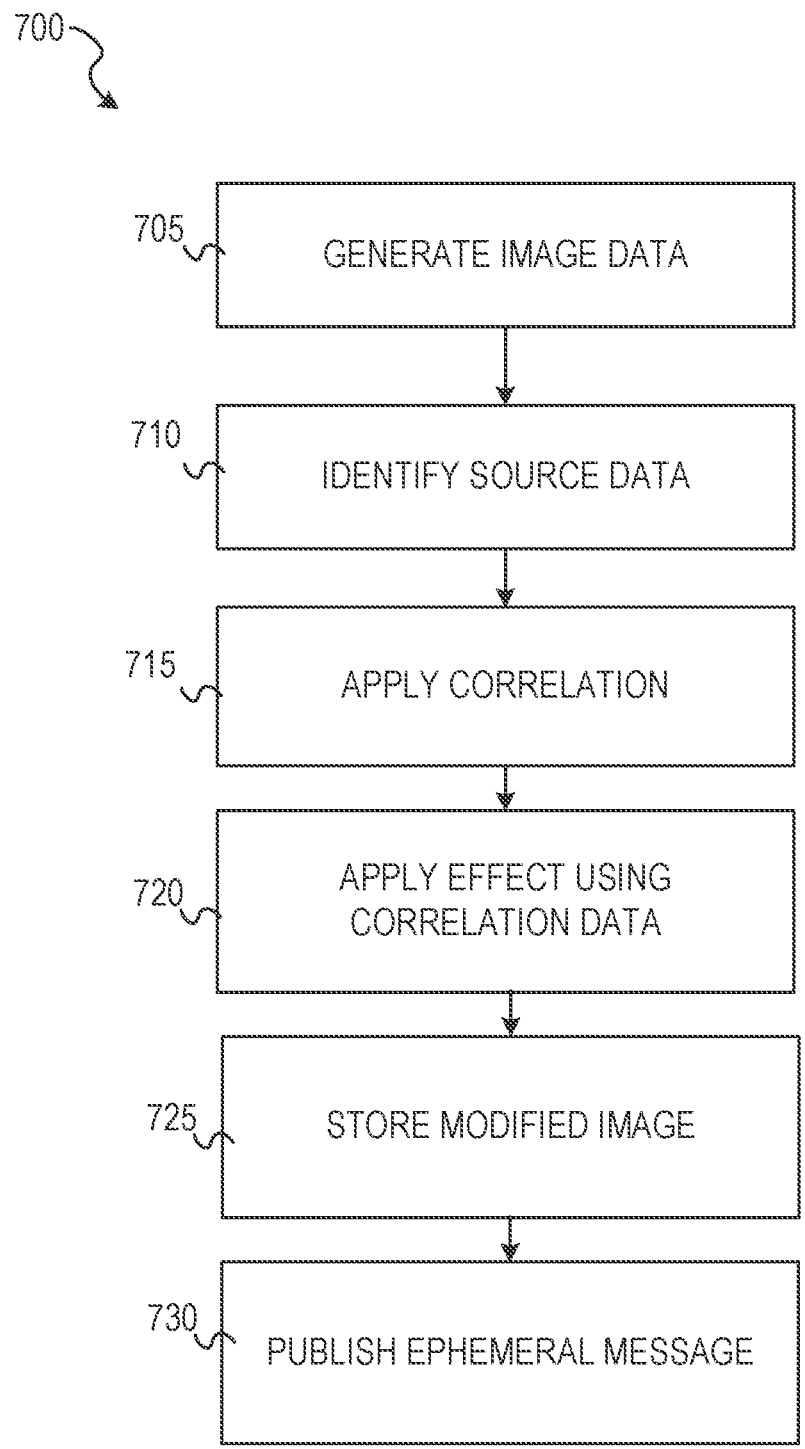
FIG. 7 shows a flow diagram of a method for implementing the correlation system, according to some example embodiments.

FIG. 7 shows a flow diagram of a method 700 for implementing the correlation system 210, according to some example embodiments. In the example method 700, the system 210 implements the correlation engine 620 to identify a pattern (e.g., a logo) in an image generated by the client device 102 (e.g., image of a soda can depicting the logo).

At operation 705, the capture engine 610 generates image data. For example, the capture engine 610 generates an image or a series of images in a live video that is generated and displayed on the screen of the client device in real time or in near real time. The images may display, for example, a soda can that depicts the lightning logo that is to be identified and tracked in other images (e.g., other frames in a live video).

At operation 710, the detection engine 617 identifies source data that is to be aligned or tracked. For example, at operation 710 the detection engine 620 applies an object detection scheme (e.g., a convolutional neural network trained to detect an object in a shape) to the image generated at operation 705 to generate an store region of interest (ROI) of a lightning bolt logo that can be used for alignment and tracking in other images.

At operation 715, the correlation engine 620 compares the pixels of the source data identified at operation 710 to the pixels of the image data generated at operation 705 using the cross correlation least squares approach discussed above. In some example embodiments, the correlation engine 620 is applied to each frame of a video sequence, thus enabling the system 210 to track the lightning bolt on the soda can even if the appearance of the lighting bolt changes (e.g., due to a user holding the can walking from an inside dim room to an outdoor bright sunlit lawn, or walking under varying shadows from tree branches).

At operation 720, the content engine 615 applies an image effect using the tracked feature. For example, at operation 720 the content engine 615 applies overlay content on the tracked lightning bolt to create an augmented reality experience using client device 102. For instance, the user may view the soda can using his/her client device imager, and the content engine 615 can generate a cartoon halo around the lightning bolt to emphasize it to the user. As an additional example, the content engine 615 can display a cartoon halo and a pop-up window that displays nutritional information of the soda can contents. In this example, as the user moves the soda can within the field of view of the video, the cartoon halo and pop-up window maintain their position with respect to the lightning bolt (that is, for example, the halo and the pop-up window appear to be "pinned" to the lightning bolt).

At operation 725, the interface engine 605 stores the modified images in memory of the client device 102. For example, at operation 725 the interface engine 605 receives selection of a post or save button displayed on the client device 102, and in response, the interface engine 605 saves a short video clip of the soda can with the pinned halo and pop-up window in an image gallery of application 104.

At operation 730, the interface engine 605 publishes the modified images in an ephemeral message on a social network site (e.g., social network system 122), as discussed above. Other users running instances of messaging client application 104 may then download the modified images and view the modified lighting bolt ephemeral message.

Figure 8:
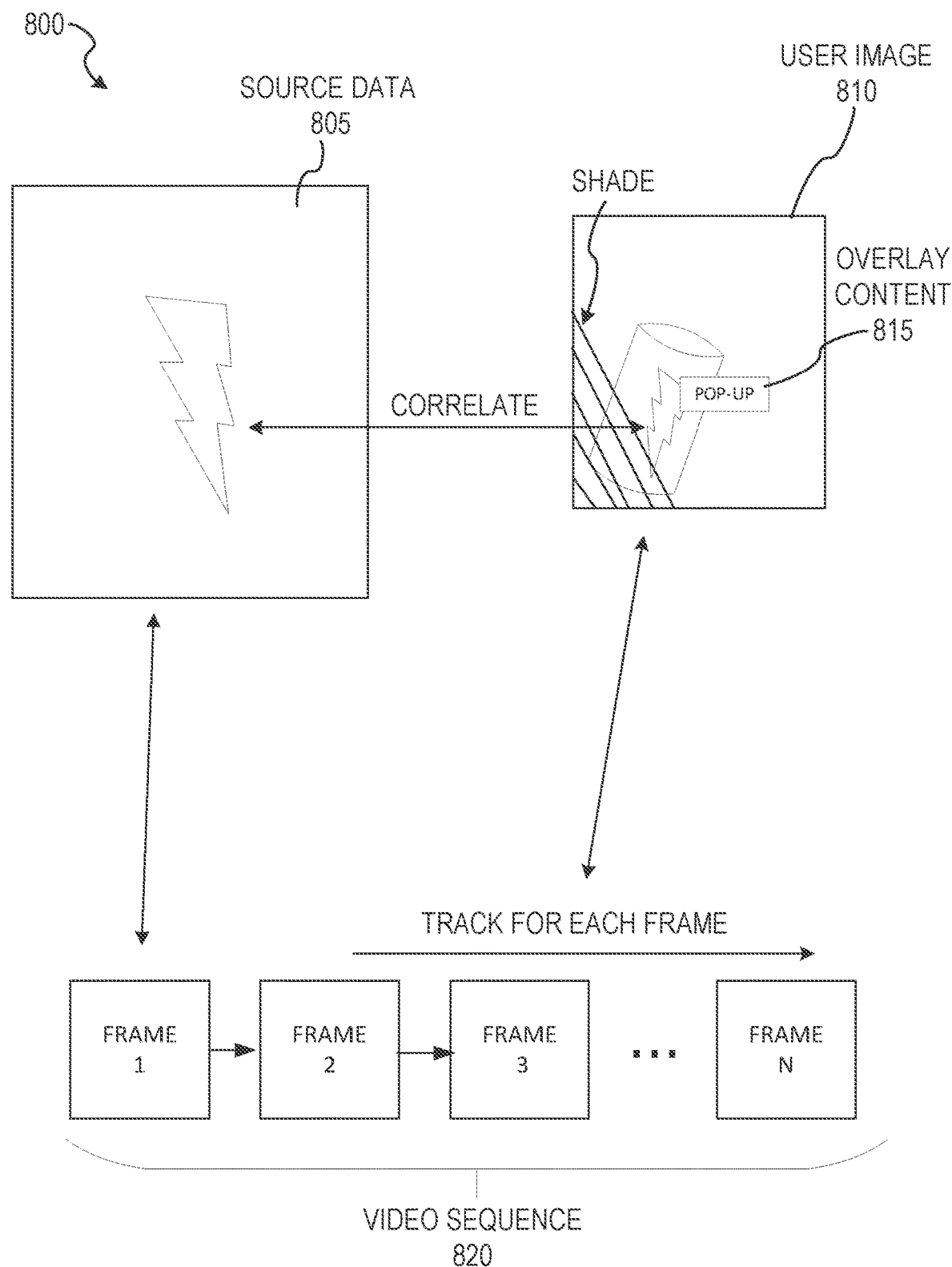
FIG. 8 shows an example data flow of the correlation system processing image data, according to some example embodiments.

FIG. 8 shows an example data flow 800 of the correlation system 210 processing image data, according to some example embodiments. The source data 805 is a model or ground truth of a pattern to be detected in user-generated data. For example, the source data 805 can be a high-quality image of a lightning bolt logo that is to be detected in user-generated images. In some example embodiments, the object to be tracked is first identified via the detection engine 617 and then tracked via the correlation engine 620. For example, the capture engine 610 can generate a video sequence 820 and the source data 805 can be the first image in the sequence that depicts the logo to be tracked as determined by the detection engine 617 (e.g., the first frame that depicts the bolt is set as the source data 805, or a region of interest with the first frame that encircles the bolt is stored as the source data). Then tracking of the lightning bolt can be performed using correlation engine 620. For example, the correlation engine 620 applies NCC least squares scheme between the initial estimate data (e.g., the ROI or source data 805) and a given frame in the video sequence 820.

Further, even though the user image 810 (e.g., frame 3 of the video sequence 820) may depict the logo in widely dynamic conditions, such as being partially obscured by shade, the correlation engine 620 can track the bolt the bolt using the NCC least squares scheme on the user's device.

In some example embodiments, in response to determining that the bolt is depicted and tracked, the content engine 615 displays a pop-up window 815 that maintains its position with respect to the bolt (e.g., the pop-up window 815 remains pinned to the top right corner of the bolt as the bolt changes its apparent position within the field of view of the camera). Further, due to the efficient configuration of the correlation engine 620, the lightning bolt can be tracked in each frame of a video sequence 820 and modified content (e.g., overlay content) can be generated and displayed in real-time or near real-time on the client device 102.

Figure 9:
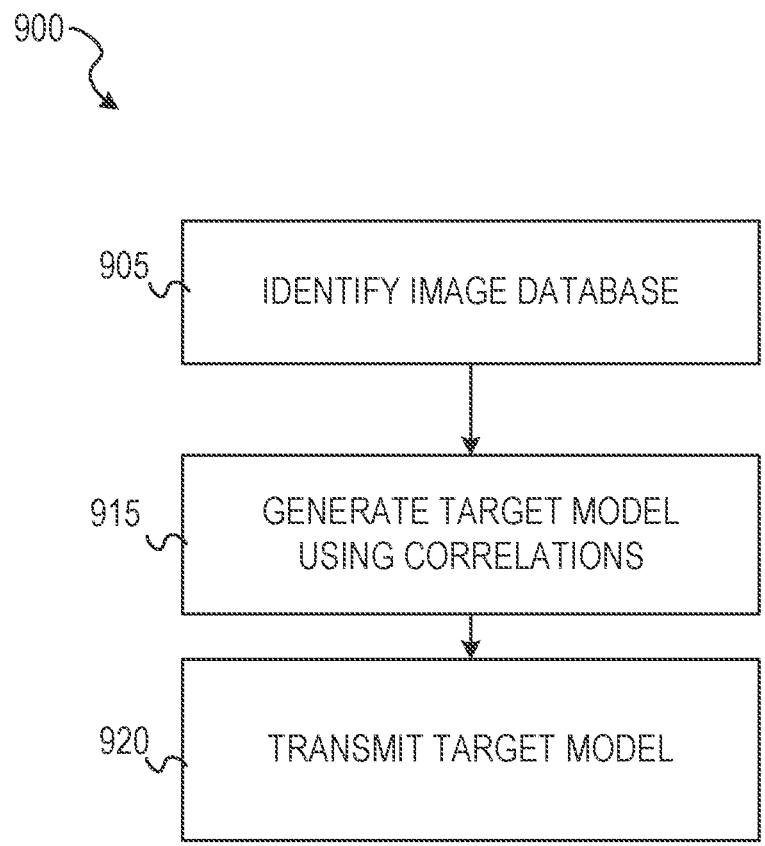
FIG. 9 shows an example flow diagram of a method for model construction from different images, according to some example embodiments.

FIG. 9 shows an example flow diagram of a method 900 for model construction from different images, according to some example embodiments. In the examples of FIGS. 9-10B, the correlation engine 620 is applied to user images of the same object from different perspectives to generate a three-dimensional model of the object that can be used for further processing. For example, a plurality of users with instances of messaging application 104 take a photograph of the Washington Monument in Washington D.C., and all of the images are then uploaded and stored in database 120. The correlation engine 620 can apply the least squares NCC approach discussed above to align different features of the Washington Monument even though the different images may be captured from different angles in widely varying lighting conditions. The points tracked via NCC correlation are then used by the construction engine 625 to generate a 3D model of the Washington Monument, which can then be used for augmented image effects, such as placing a cartoon hat on top of the Washington Monument as viewed through the live video.

The following example method 900 is performed by correlation system 150 which contains one or more of the engines of correlation system 210. For example, the correlation system 150 can include the correlation engine 620 and the construction engine 625 to track points and construct a 3D model, which is then transmitted to instances of the correlation system 210 operating on different client devices. The client devices can then implement the content engine 615 to perform augmented reality effects with the 3D model. Further, in some example embodiments, the correlation engine 620 and the construction engine 625 can be implemented entirely on the client device 102 to construct 3D model data in real time, e.g., as the client device 102 generates live video of a given object (e.g., a building, a soda can).

At operation 905, the correlation engine 620 identifies an image database comprising a plurality of images depicting an object to be 3D modeled. For example, the plurality of images may include a first image that depicts a building from a first angle and a second image that depicts the same building from a second different angle, and so on (and some images may be from the same angle and same lightning, same angle or different lighting, etc.).

At operation 915, the construction engine 625 generates a three-dimensional model from the images using NCC least schemes optimization in 3D model reconstruction techniques, such as SfM (Structure from Motion, an offline approach that jointly computes camera positions and sparse geometry from a set of images), Multi-view Stereopsis Reconstruction (an offline approach that, given a set of images and their camera positions, generates dense geometry of the scene), SLAM (Simultaneous Localization and Mapping, an online system that jointly computes camera position for each consecutive frame of a video, in real time, as it is captured, as well as a sparse estimate of the scene geometry), and others. In these example embodiments, the construction engine 625 (operating on the server or on the user device) can implement the NCC least squares scheme with any of the construction methods, and additionally, can use the output of the above methods to track an object. For example, the construction engine 625 can implement NCC least squares within a SLAM approach to reconstruct an unknown scene/object on user's mobile device (e.g., client device 102), and the correlation engine 620 can implement the NCC least squares to track the camera position relative to the scene/object.

At operation 920, the construction engine 920 transmits the generated 3D model data to instances of the system 210 functioning on different client devices. For example, an instance of the system 210 can receive the generated 3D model and an image the 3D model as blowing up or falling apart on an overlay layer of live video generated by the client device.

Figure 10A:
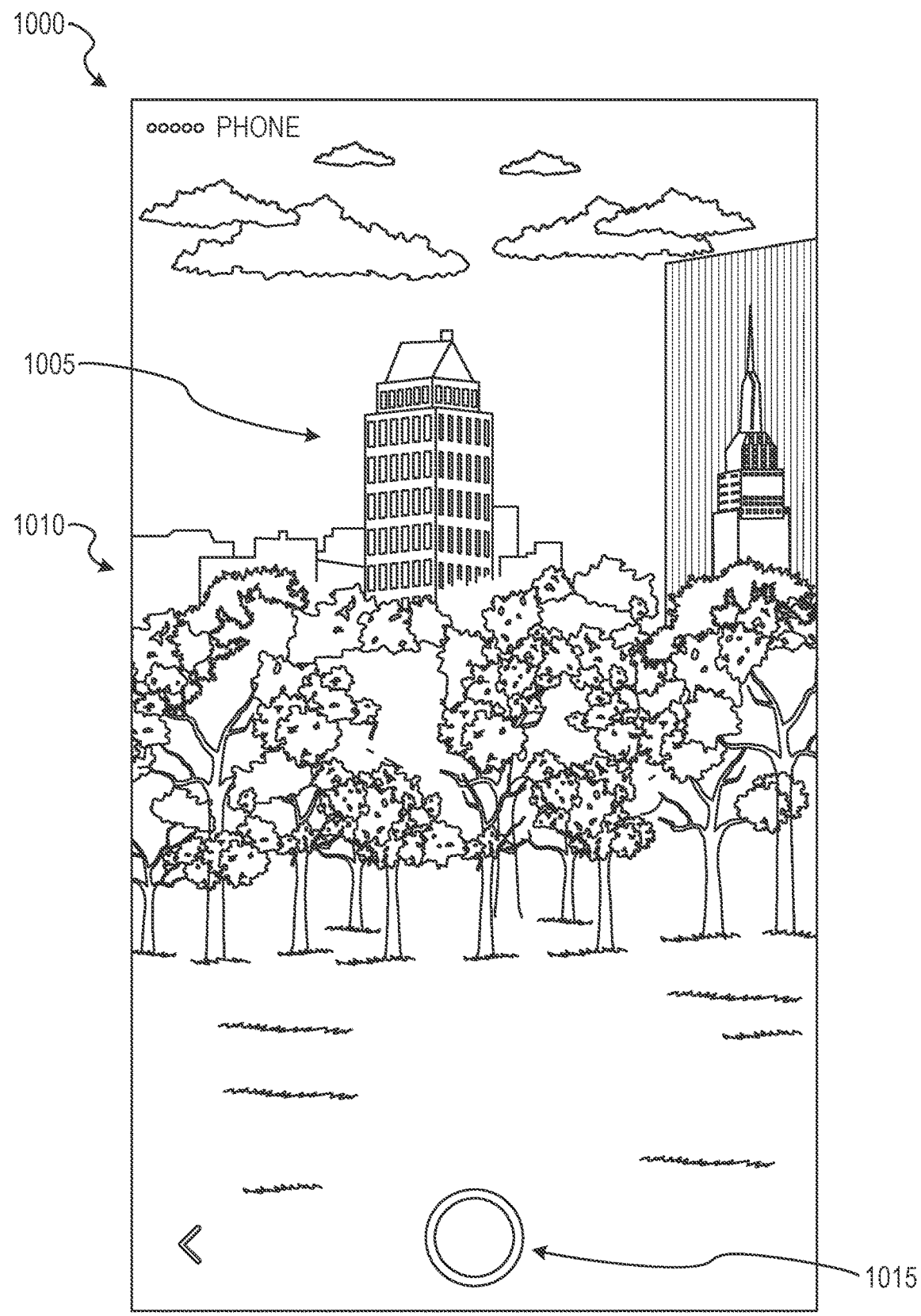
FIGS. 10A and 10B show example user interfaces for image processing using the correlation system, according to some example embodiments.
Figure 10B:
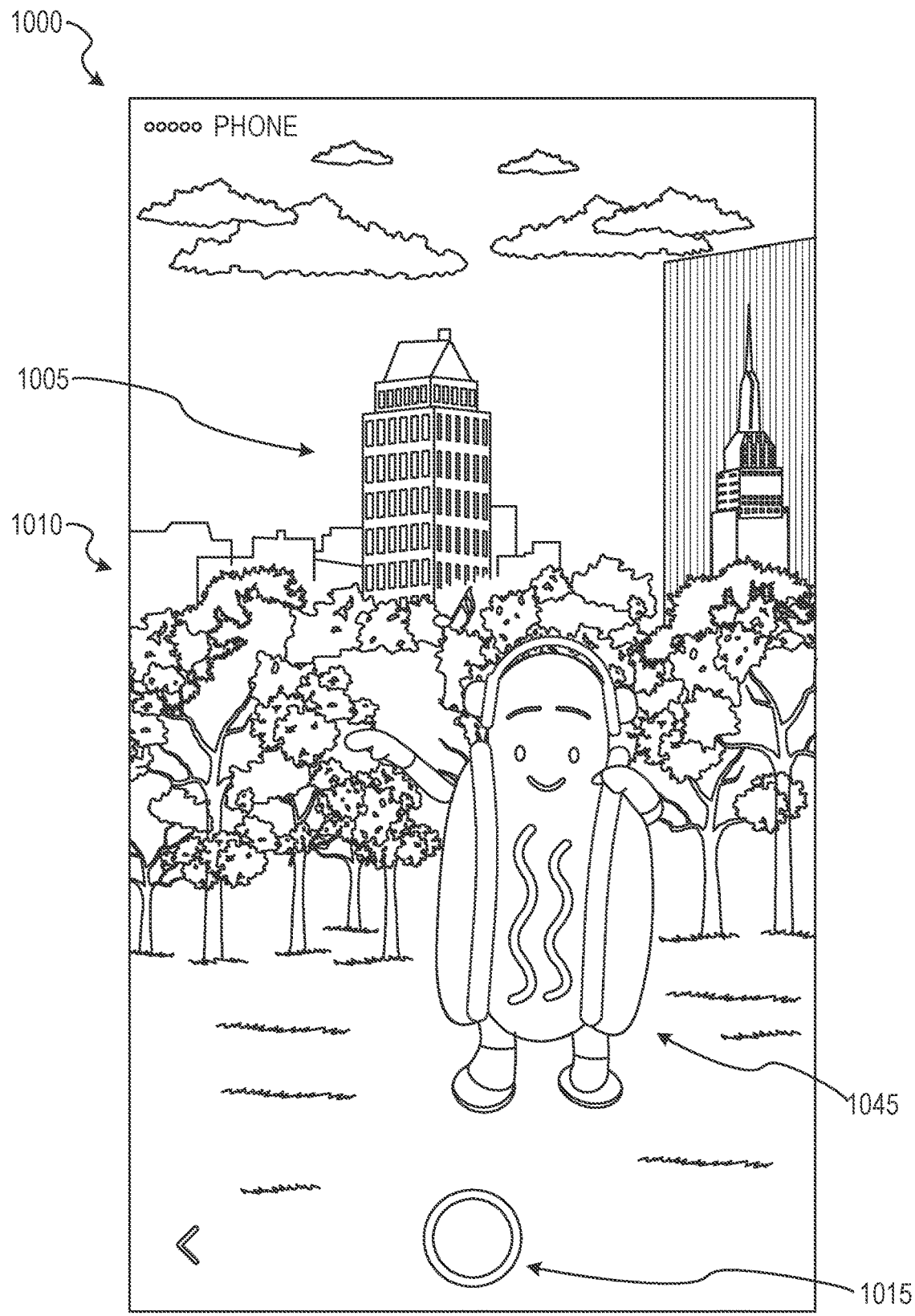

FIGS. 10A and 10B show example user interfaces for image processing using the correlation system 210, according to some example embodiments. In FIG. 10A, a user interface 1000 generated by interface engine 605 displays live video 1010 captured by an image sensor of the client device 102 in response to a user (not depicted) pressing and holding down the capture button 1015. The live video 1010 depicts a park with a building 1005 in the background. The building 1005 is an example pattern that can be processed by applying the detection engine 617 and correlation engine 620 to frames of the live video to detect and track the building 1005 to apply an image effect. For example, with reference to FIG. 10B, in response to detecting (e.g., via detection engine 617) that the building is in the live video 1010, the content engine 615 can display a dancing cartoon hotdog 1045 and the cartoon dancing hotdog can maintain its position with respect to the building 1005 as tracked by the correlation engine 620 as discussed above.

As a further example, the building 1005 is an example of an image feature that can be uploaded to database 120 to create a 3D model using the correlation engine 620 and the construction engine 625. For example, assume the building 1005 is an average city building and no 3D model exists of the building 1005. Conventionally, creating a 3D model for the building may not be practical as it would require careful measurements and real-world analysis of the building. However, the construction engine 625 can implement the least squares NCC scheme to correlate points of the building in different user images to generate a 3D reconstructed model of the building 1005. The 3D model data can then be sent to the client device for processing. For example, with reference to FIG. 10B, the 3D model of the building can be overlaid on the building 1005 (e.g., in a different user interface layer) and image effects can be applied to the 3D model to create an augmented reality experience. For example, an explosion effect can be applied to the 3D model of the building 1005 or the pixels of the image data can be remapped and enlarged on the 3D model to cause the building 1005 to apparently grow in size as viewed through the live video 1010. In some example embodiments, the 3D model data is used for augmented reality effects in addition to being used to identify, track, or align the building in images. For example, a 2D render can be generated from the 3D model of the building, and the 2D render can be compared to frames of the live video to determine that the live video depicts a feature that is similar to or exactly matches the building of the 2D render. One benefit of the least squares NCC approach discussed above is that the construction engine 625 can efficiently apply the least squares NCC on the client device 102 to generate 3D model data on the client device 102 without server support (e.g., without receiving model data from an instance of the construction engine running in system 150, server-side).

FIG. 11 is a block diagram illustrating an example software architecture 1106, which may be used in conjunction with various hardware architectures herein described. FIG. 11 is a non-limiting example of a software architecture, and it will be appreciated that many other architectures may be implemented to facilitate the functionality described herein. The software architecture 1106 may execute on hardware such as a machine 1200 of FIG. 12 that includes, among other things, processors 1210, memory 1230, and I/O components 1250. A representative hardware layer 1152 is illustrated and can represent, for example, the machine 1200 of FIG. 12. The representative hardware layer 1152 includes a processing unit 1154 having associated executable instructions 1104. The executable instructions 1104 represent the executable instructions of the software architecture 1106, including implementation of the methods, components, and so forth described herein. The hardware layer 1152 also includes a memory/storage 1156, which also has the executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response in the form of messages 1112. The layers illustrated are representative in nature and not all software architectures have all layers. For example, some mobile or special-purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, 11.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems, interactions with a user may occur through a presentation layer, such as the presentation layer 1114. In these systems, the application/component "logic" can be separated from the aspects of the application/component that interact with a user.

Figure 12:
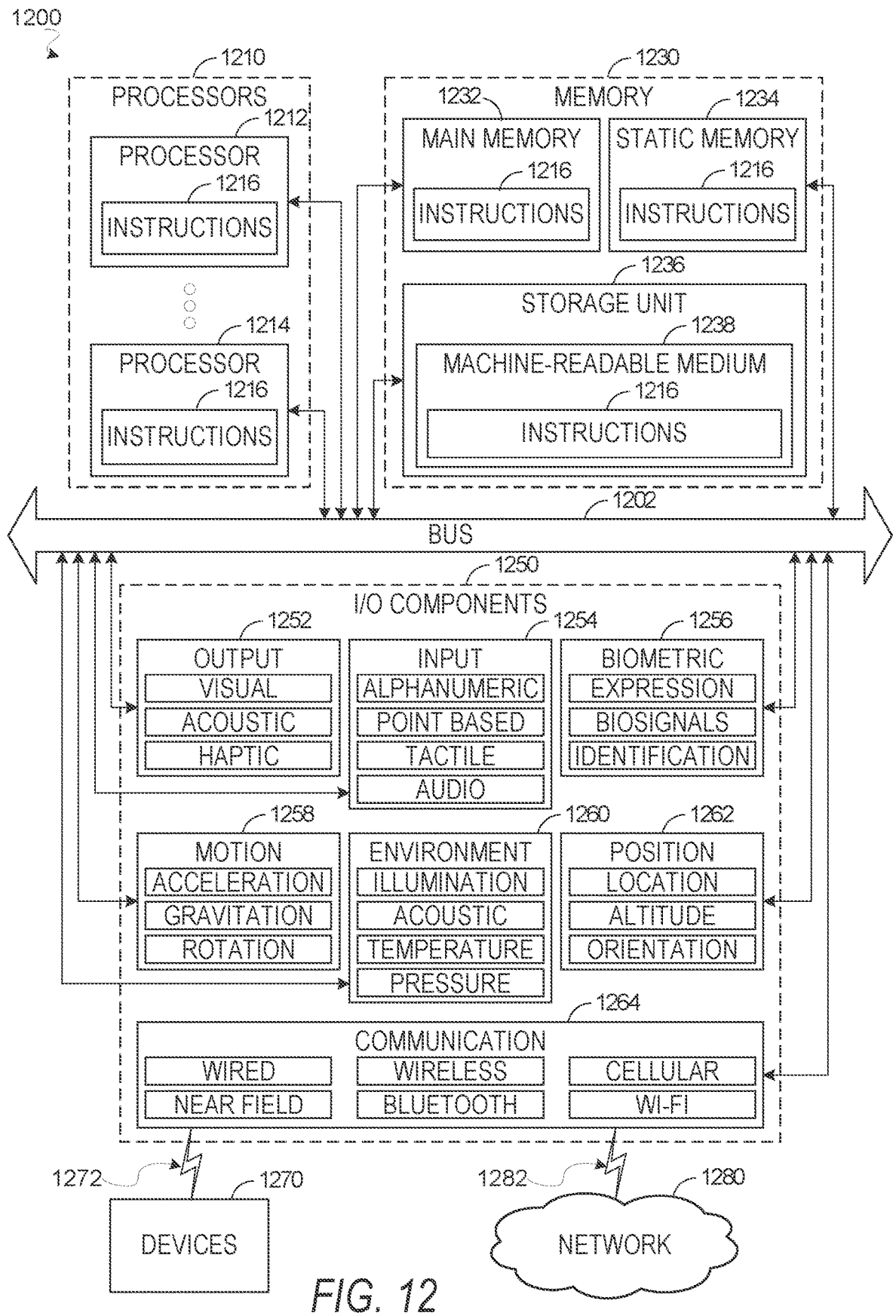
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. As such, the instructions 1216 may be used to implement modules or components described herein. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. The memory/storage 1230 may include a main memory 1232, static memory 1234, and a storage unit 1236, both accessible to the processors 1210 such as via the bus 1202. The storage unit 1236 and main memory 1232 store the instructions 1216 embodying any one or more of the methodologies or functions described herein. The instructions 1216 may also reside, completely or partially, within the main memory 1232, within the storage unit 1236 (e.g., on machine readable-medium 1238), within at least one of the processors 1210 (e.g., within the processor cache memory accessible to processors 1212 or 1214), or any suitable combination thereof, during execution thereof by the machine 1200. Accordingly, the main memory 1232, the storage unit 1236, and the memory of the processors 1210 are examples of machine-readable media.

The I/O components 1250 may include a wide variety of components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environment components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environment components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or other suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1216 for execution by the machine 1200, and includes digital or analog communications signals or other intangible media to facilitate communication of such instructions 1216. Instructions 1216 may be transmitted or received over the network 1280 using a transmission medium via a network interface device and using any one of a number of well-known transfer protocols.

"CLIENT DEVICE" in this context refers to any machine 1200 that interfaces to a network 1280 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1280.

"COMMUNICATIONS NETWORK" in this context refers to one or more portions of a network 1280 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1280 may include a wireless or cellular network and the coupling 1282 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1216 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions 1216 (e.g., code) for execution by a machine 1200, such that the instructions 1216, when executed by one or more processors 1210 of the machine 1200, cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1212 or a group of processors 1210) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1200) uniquely tailored to perform the configured functions and are no longer general-purpose processors 1210.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1212 configured by software to become a special-purpose processor, the general-purpose processor 1212 may be configured as respectively different special-purpose processors (e.g., comprising different hardware components) at different times. Software accordingly configures a particular processor 1212 or processors 1210, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1210 that are temporarily configured (e.g., by software) or permanently configured to perform the relevant operations. Whether temporarily or permanently configured, such processors 1210 may constitute processor-implemented components that operate to perform one or more operations or functions described herein. As used herein, "processor-implemented component" refers to a hardware component implemented using one or more processors 1210. Similarly, the methods described herein may be at least partially processor-implemented, with a particular processor 1212 or processors 1210 being an example of hardware. For example, at least some of the operations of a method may be performed by one or more processors 1210 or processor-implemented components. Moreover, the one or more processors 1210 may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network 1280 (e.g., the Internet) and via one or more appropriate interfaces (e.g., an API). The performance of certain of the operations may be distributed among the processors 1210, not only residing within a single machine 1200, but deployed across a number of machines 1200. In some example embodiments, the processors 1210 or processor-implemented components may be located in a single geographic location (e.g., within a home environment, an office environment, or a server farm). In other example embodiments, the processors 1210 or processor-implemented components may be distributed across a number of geographic locations.

"PROCESSOR" in this context refers to any circuit or virtual circuit (a physical circuit emulated by logic executing on an actual processor 1212) that manipulates data values according to control signals (e.g., "commands," "op codes," "machine code," etc.) and which produces corresponding output signals that are applied to operate a machine 1200. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1210 may further be a multi-core processor 1210 having two or more independent processors 1212, 1214 (sometimes referred to as "cores") that may execute instructions 1216 contemporaneously.

"TIMESTAMP" in this context refers to a sequence of characters or encoded information identifying when a certain event occurred, for example giving date and time of day, sometimes accurate to a small fraction of a second.

What is claimed is:

1. A method implemented by one or more processors of a mobile device, the method comprising:
   obtaining a plurality of images comprising a sequence of video frames showing a scene over a range of lighting conditions;
   obtaining source data comprising a model or ground truth of a predetermined visual pattern;
   processing the plurality of images to:
     identify a pattern visible in the plurality of images across the range of lighting conditions, the pattern comprising views of the predetermined visual pattern; and
     generate region of interest (ROI) data identifying a respective region of each image of the plurality of images where the pattern is visible;
   processing the plurality of images and the ROI data to align points in the plurality of images to the pattern visible within the respective regions by using a Jacobian of a normalized cross correlation (NCC) cost function in a least squares optimization framework; and
   generating one or more modified images in real time as the sequence of video frames is obtained by applying an augmented reality effect to one or more images of the plurality of images using the aligned points.

2. The method of claim 1, wherein:
   the predetermined visual pattern comprises a logo.

3. The method of claim 2, further comprising:
   determining that the plurality of images depicts the pattern using an object recognition machine learning scheme.

4. The method of claim 3, wherein the object recognition machine learning scheme includes a convolutional neural network trained to detect the pattern.

5. The method of claim of claim 1, wherein the aligned points in the one or more images are used to track the pattern throughout the one or more images.

6. The method of claim 1, further comprising:
   generating, from the aligned points, a 3D model of the pattern tracked in the one or more images, wherein the 3D model is generated using least squares optimized cross correlation in a reconstruction modeling scheme.

7. The method of claim 6, wherein the reconstruction modeling scheme is a simultaneous localization and mapping (SLAM) scheme.

8. The method of claim 6, wherein the least squares optimized cross correlation implements cost functions comprising one or more of: a global cost function and a local cost function.

9. The method of claim 1, wherein the one or more images include a live video generated by an image sensor.

10. The method of claim 9, wherein the aligning of the points in the one or more images to the pattern is applied to each frame in the live video in real time or near real time.

11. The method of claim 10, wherein applying the aligning of the points in the one or more images to the pattern comprises:
displaying content on the live video using the pattern.

12. The method of claim 1, wherein the sequence of video frames showing the scene over the range of lighting conditions comprises one or more video frames in which the pattern is covered by a shadow.

13. The method of claim 12, wherein the NCC cost function comprises a localized cost function that functions over image patches within a given image.

14. The method of claim 13, wherein the localized cost function tracks the pattern as the pattern is covered by a shadow.

15. A system comprising:
one or more processors of a mobile device;
an image sensor; and
a memory storing instructions that, when executed by the one or more processors, cause the mobile device to perform operations comprising:
obtaining a plurality of images comprising a sequence of video frames showing a scene over a range of lighting conditions;
obtaining source data comprising a model or ground truth of a predetermined visual pattern;
processing the plurality of images to:
identify a pattern visible in the plurality of images across the range of lighting conditions, the pattern comprising views of the predetermined visual pattern; and
generate region of interest (ROI) data identifying a respective region of each image of the plurality of images where the pattern is visible;
processing the plurality of images and the ROI data to align points in the plurality of images to the pattern visible within the respective regions by using a Jacobian of a normalized cross correlation (NCC) cost function in a least squares optimization framework; and
generating one or more modified images in real time as the sequence of video frames is obtained by applying an augmented reality effect to one or more images of the plurality of images using the aligned points.

16. The system of claim 15, wherein:
the predetermined visual pattern comprises a logo.

17. The system of claim 16, the operations further comprising:
determining that an initial image of the sequence of video frames depicts the pattern using an object recognition machine learning scheme.

18. The system of claim 15, the operations further comprising:
generating, from the aligned points, a 3D model of the pattern tracked in the one or more images, wherein the 3D model is generated using least squares optimized cross correlation in a reconstruction modeling scheme.

19. A non-transitory machine-readable storage device embodying instructions that, when executed by a mobile device, cause the mobile device to perform operations comprising:
obtaining a plurality of images comprising a sequence of video frames showing a scene over a range of lighting conditions;
obtaining source data comprising a model or ground truth of a predetermined visual pattern;
processing the plurality of images to:
identify a pattern visible in the plurality of images across the range of lighting conditions, the pattern comprising views of the predetermined visual pattern; and
generate region of interest (ROI) data identifying a respective region of each image of the plurality of images where the pattern is visible;
processing the plurality of images and the ROI data to align points in the plurality of images to the pattern visible within the respective regions by using a Jacobian of a normalized cross correlation (NCC) cost function in a least squares optimization framework; and
generating one or more modified images by applying an augmented reality effect to one or more images of the plurality of images using the aligned points.

20. The non-transitory machine-readable storage device of claim 19, wherein:
the predetermined visual pattern comprises a logo.

* * * * *